US009642112B2

(12) United States Patent
Costa

(10) Patent No.: US 9,642,112 B2
(45) Date of Patent: May 2, 2017

(54) SYSTEM AND METHOD FOR TRACKING ASSETS INCORPORATING WIRELESS NETWORK

(71) Applicant: AVOCENT HUNTSVILLE CORP., Huntsville, AL (US)

(72) Inventor: Mario Costa, Davie, FL (US)

(73) Assignee: Avocent Huntsville, LLC, Huntsville, AL (US)

( * ) Notice: Subject to any disclaimer, the term of this patent is extended or adjusted under 35 U.S.C. 154(b) by 0 days.

(21) Appl. No.: 14/434,569

(22) PCT Filed: Oct. 11, 2013

(86) PCT No.: PCT/US2013/064563
§ 371 (c)(1),
(2) Date: Apr. 9, 2015

(87) PCT Pub. No.: WO2014/059289
PCT Pub. Date: Apr. 17, 2014

(65) Prior Publication Data
US 2015/0282113 A1    Oct. 1, 2015

Related U.S. Application Data

(60) Provisional application No. 61/712,624, filed on Oct. 11, 2012.

(51) Int. Cl.
*H04W 64/00* (2009.01)
*H04W 4/02* (2009.01)
(Continued)

(52) U.S. Cl.
CPC ......... *H04W 64/003* (2013.01); *H04W 4/028* (2013.01); *H04W 84/18* (2013.01); *H04W 88/16* (2013.01)

(58) Field of Classification Search
CPC ....... H04W 64/00; H04W 4/02; H04W 88/16; H04W 84/18
(Continued)

(56) References Cited

U.S. PATENT DOCUMENTS

2003/0041237 A1* 2/2003 Mcelroy ........... H04L 29/06027
                                                    713/151
2005/0171876 A1* 8/2005 Golden ................. G06Q 40/12
                                                    705/30

(Continued)

OTHER PUBLICATIONS

International Search Report and Written Opinion for PCT/US2013/064563, mailed Nov. 26, 2013; ISA/KR.

*Primary Examiner* — Inder Mehra
(74) *Attorney, Agent, or Firm* — Harness, Dickey & Pierce, P.L.C.

(57) ABSTRACT

A system is disclosed for tracking assets in a facility. The system may have at least one asset having a service processor containing identification information which uniquely identifies the at least one asset among a group of assets. The at least one asset may further have a module for reporting the identification information to a gateway device. A data center infrastructure management system may be used which is in communication with the gateway device for receiving the identification information. The identification information may subsequently be used with an asset tracking system.

20 Claims, 3 Drawing Sheets

Figure 1:
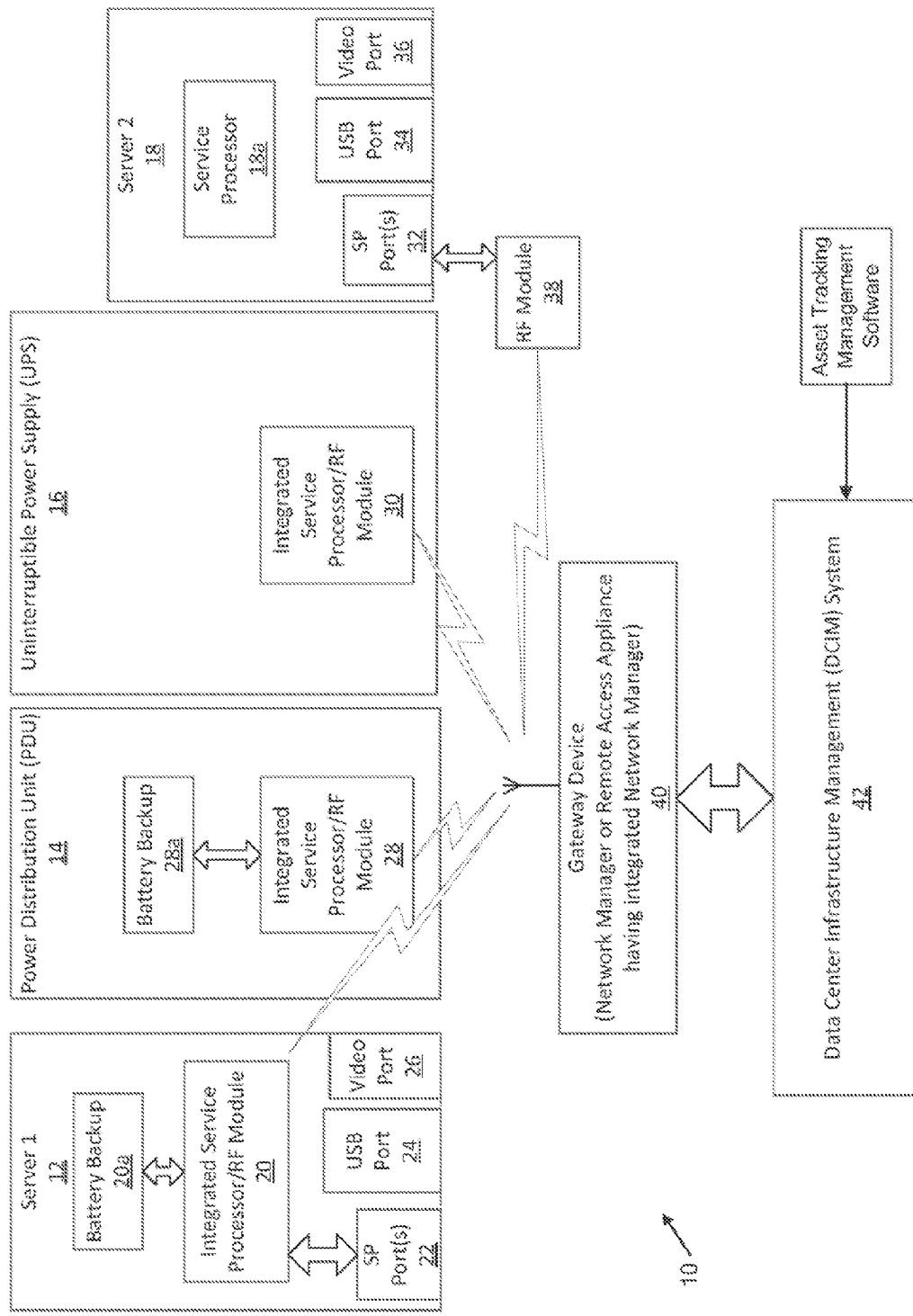

(51) Int. Cl.
*H04W 88/16* (2009.01)
*H04W 84/18* (2009.01)

(58) Field of Classification Search
USPC .................. 455/456.1, 404.2, 41.2, 414.1
See application file for complete search history.

(56) References Cited

U.S. PATENT DOCUMENTS

| | | | |
|---|---|---|---|
| 2007/0273517 A1* | 11/2007 | Govind | G06F 19/322 |
| | | | 340/572.1 |
| 2008/0291918 A1 | 11/2008 | Turcot | |
| 2012/0014278 A1 | 1/2012 | Ameti et al. | |
| 2012/0250619 A1 | 10/2012 | Twitchell, Jr. | |
| 2013/0265155 A1* | 10/2013 | Wible | G06Q 50/28 |
| | | | 340/539.13 |
| 2014/0071938 A1* | 3/2014 | Chin | H04W 36/30 |
| | | | 370/331 |

\* cited by examiner

SYSTEM AND METHOD FOR TRACKING ASSETS INCORPORATING WIRELESS NETWORK

CROSS-REFERENCE TO RELATED APPLICATIONS

The present application is a U.S. National Phase Application under 35 U.S.C. 371 of International Application No. PCT/US2013/064563, filed on Oct. 11, 2013. This application is based on and claims priority from U.S. provisional application Ser. No. 61/712,624, filed Oct. 11, 2012. The entire disclosures of all of the above applications are hereby incorporated by reference into the present application.

FIELD

The present disclosure relates to systems and methods for tracking assets, and more particularly to systems and methods for tracking assets that involve the use of a service processor interfaced to an internal or external wireless module that enables pertinent information concerning the device that the service processor is installed in to be wirelessly reported to a data center infrastructure management system.

BACKGROUND

This section provides background information related to the present disclosure which is not necessarily prior art.

Tracking of assets in a data center is becoming an increasingly important function for many entities. Modern data centers have been growing significantly in size, often now encompassing hundreds or even thousands of independent components. Such components typically may involve servers, power distribution units (PDUs), network switches, and routers, as well as a wide range of other types data center components. Often these components are rack mounted in rows of racks. In large modern-day data centers there may be dozens, hundreds, or more racks in a single data center facility, with each rack containing a plurality of independent components. Some components may be standalone components, such as servers. In some instances the equipment racks may not be located in the same room but rather in multiple rooms.

It should be appreciated that managing the assets of a modern day data center can be a daunting task. Components are sometimes swapped out from one rack to another rack, and it is incumbent on the data center worker performing the swap to correctly note the change in location for each component. As time goes by, it is not uncommon for records of locations of various data center devices to become out of date and inaccurate. Having data center workers perform manual inventorying of data center assets can be a time consuming and expensive process.

Various systems and methods have been tried to more efficiently track data center assets. One such method involves radio frequency identification (ID) tags that are placed on assets before, or as, the assets are installed in racks. This requires encoding a tag with the information for a specific asset, and then affixing the tag to the asset. If the tag is removed from the asset or otherwise inadvertently separated from its associated asset, then the potential exists for the location of the asset to be lost. Also, a separate antenna is typically required to receive the RF signal from the RF ID tag of each asset. Accordingly, such a system can end up being somewhat costly when implemented in a large scale data center having dozens, hundreds or more components.

Still another system and method for data center asset tracking involves the use of a physical connection between some form of encoded ID tag and a bus-like strip mounted on a rack in which each asset is mounted. The bus-like strip collects the information from each encoded ID tag and transmits it, either wirelessly or via a wired connection, to a data center inventory management system. Obviously, if a data center worker forgets to connect the encoded ID tag with its associated strip, or if a wire should break, this can potentially lead to inaccurate reporting of a location of a specific asset. Also, physical connectors may occasionally fail to engage one another properly, and thus an ID tag will not be recognized by its associated bus-like strip. This may leave the data center worker incorrectly believing that an encoded ID tag for a given asset has been properly connected when in fact it has not.

SUMMARY

In one aspect the present disclosure relates to a system for tracking assets in a facility. The system may comprise at least one asset having a service processor containing identification information which uniquely identifies the at least one asset among a group of assets. The at least one asset may further include a module for reporting the identification information to a gateway device. A data center infrastructure management system may be included which is in communication with the gateway device for receiving the identification information. The identification information may subsequently be used with an asset tracking system.

In another aspect the present disclosure relates to a system for tracking assets in a facility. The system may comprise at least one asset having a service processor containing identification information which uniquely identifies the at least one asset among a group of assets. The system may also include a gateway device for receiving wireless signals transmitted within the facility. The at least one asset further may include a radio frequency (RF) module for reporting the identification information to the gateway device via wireless signals. A data center infrastructure management system may be included which in communication with the gateway device for receiving the identification information. The identification information may be subsequently used with an asset tracking system.

In still another aspect the present disclosure relates to a method for tracking assets in a facility. The method may comprise providing at least one asset with a service processor containing identification information which uniquely identifies the at least one asset among a group of assets. The method may also involve placing a module in communication with the service processor, with the module being configured to report the identification information to a gateway device. A data center infrastructure management system may be used in communication with the gateway device for receiving the identification information for subsequent use with an asset tracking system.

DRAWINGS

Figure 2:
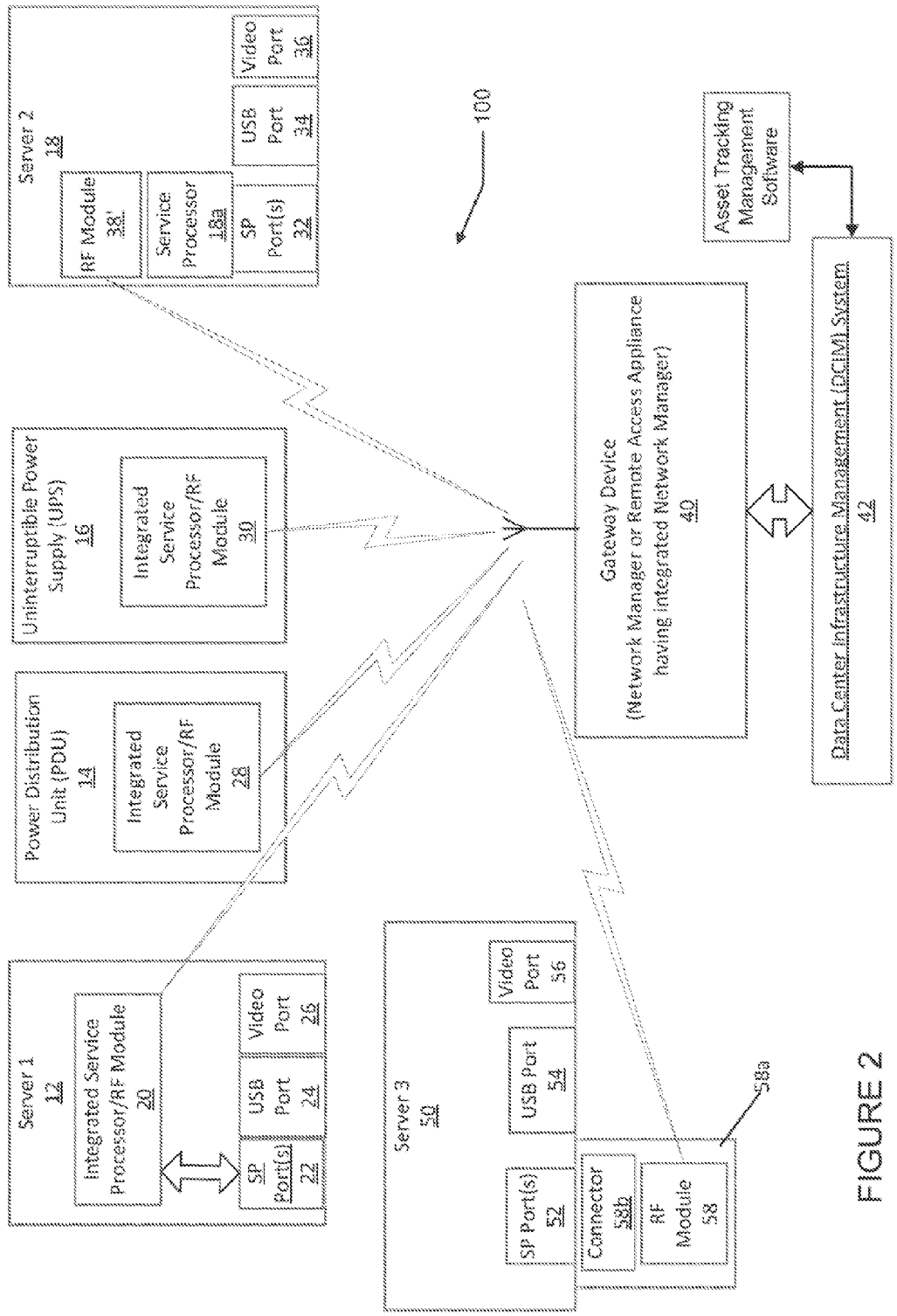
Figure 3:
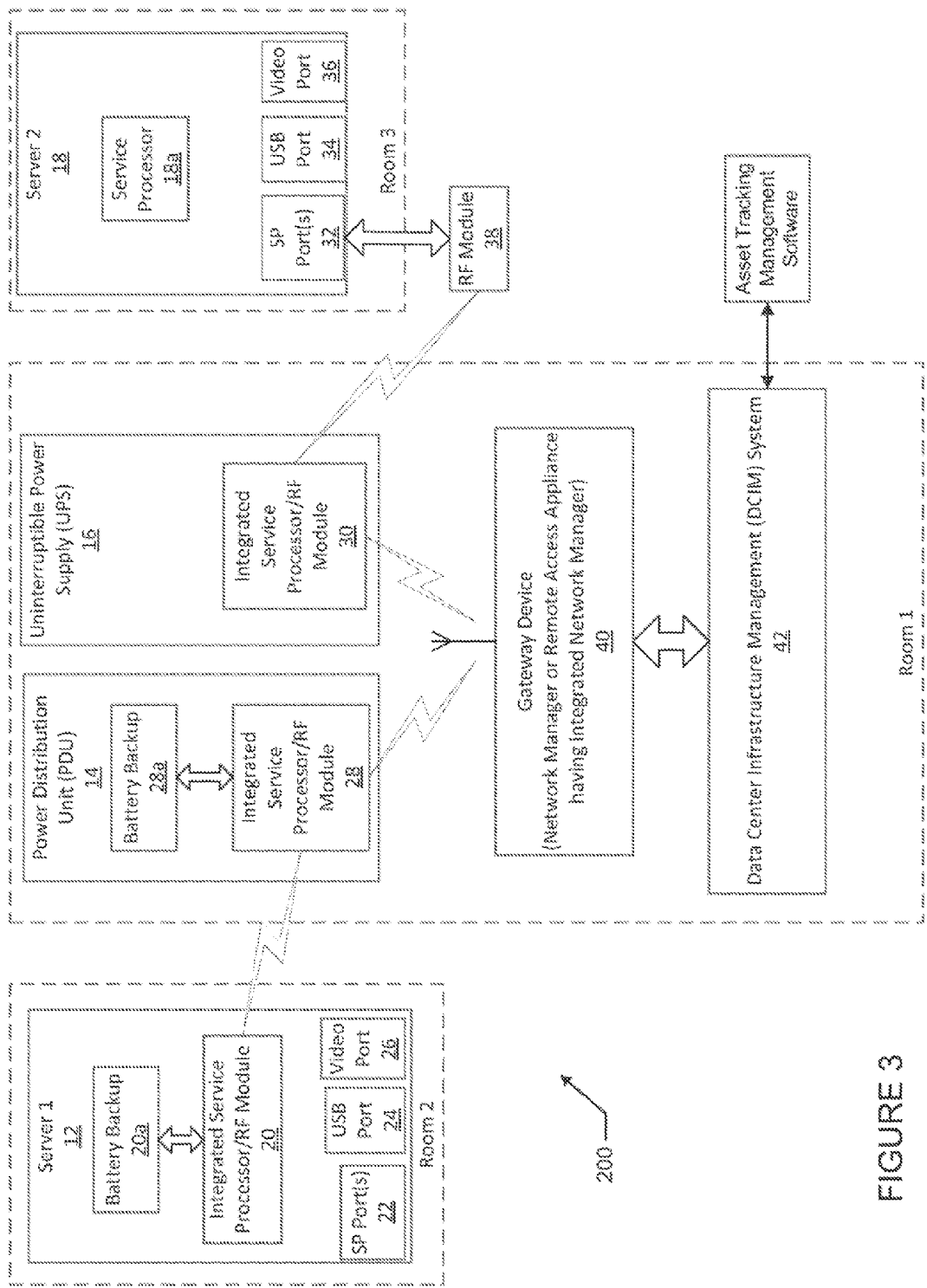

The drawings described herein are for illustrative purposes only of selected embodiments and not necessarily for all possible implementations. Furthermore, the drawings are not intended to limit the scope of the present disclosure. In the drawings:

FIG. 1 is a high level block diagram of one example of a plurality of data center assets that each make use of a radio frequency (RF) module for communicating information from a service processor of the component to a gateway device (i.e., a network manager or a remote access appliance having a built-in network manager), and where several of the assets have the RF module integrated with the service processor;

FIG. 2 is a high level block diagram showing an implementation of the present disclosure where at least one device, in this example Server 2, has an internal RF module that communicates with the service processor but is not integrated with the service processor, and also where one server (Server 3) has an RF module physically coupled to its service processor (SP) port; and FIG. 3 is a high level block diagram illustrating another implementation where Servers 1 and 2 are in different rooms than the gateway device, but each is still able to communicate with the gateway device by using a nearby integrated SP/RF module in either the UPS or the PDU as a "relay" node.

DETAILED DESCRIPTION

Example embodiments will now be described more fully with reference to the accompanying drawings. Corresponding reference numerals indicate corresponding parts throughout the several views of the drawings.

Referring to FIG. 1, there is shown one implementation of a system 10 in accordance with the present disclosure. The system 10 in this example involves the use of various data center assets shown as a first server 12, a power distribution unit ("PDU") 14, an uninterruptible power supply ("UPS") 16, and a second server 18. Server 12 may include an integrated service processor/RF module 20 (hereinafter "SP/RF module 20") along with one or more service processor ports 22, a universal serial bus (USB) port 24 and a video port 26. PDU 14 includes its own integrated service processor/RF module 28 (hereinafter "SP/RF module 28"). Likewise, UPS 16 includes its own integrated service processor/RF module 30 (hereinafter "SP/RF module 30"). Server 18 includes one or more service processor ports 32, a USB port 34 and a video port 36. In this example at least one of the service processor ports 32 is in communication via a suitable cable with an independent, stand-alone RF module 38. All of the SP/RF modules 20, 28 and 30, as well as RF module 38, are in communication with a gateway device 40. The gateway device 40 may comprise either a network manager or a remote access appliance having an integrated network manager. The gateway device 40 may in turn be in communication with a data center infrastructure management ("DCIM") system 42 via either a local area network or a wide area network, or possibly even by even a hard-wired, direct connection.

It will be appreciated that while the figures illustrate a data center implementation using servers 12 and 18, the PDU 14, and the UPS 16, a wide variety of other types of data center assets could be used with the teachings of the present disclosure. Basically any type of asset which includes a service—or controlling—processor may be incorporated into the system 10. Still further, the system 10 is not limited to use with only data center assets. The system 10 could be used in various other types of environments such as factory, warehousing, manufacturing, or even health care environments to track the locations of various assets, provided the assets incorporate some form of electronically stored identification information that can be read by an integrated or stand-alone RF module as described herein.

Optionally, server 12 and PDU 14 may include built-in battery backup modules 20a and 28a, respectively, to provide power to their respective SP/RF modules 20 and 28 in the event power is lost to the server 12 and/or PDU 14. This would enable the SP/RF modules 20 and 28 to remain operational when AC mains power is lost. This also provides the important advantage that the asset (i.e., server 12 or PDU 14) may still be tracked even if it is powered down and moved to a new area without recording the change in location. In such a situation, for example, the SP/RF module 20 would continue to report basic identification information (e.g., serial number, model number, etc.) to the gateway device 40, even though it is no longer present at its previous location in the data center. A data center worker monitoring the system 10 may recognize this by noting that the asset is still reporting information (e.g., serial number, model number, etc.), even though the asset is no longer present at the location where the data center worker expects it to be. In this scenario the data center worker may deduce that an unrecorded (or unauthorized) asset change has been made within the data center, and that the asset is somewhere in the near vicinity of the location where it was last recorded as being.

The RF module 38, as well as the RF module portion of each of the SP/RF modules 20, 28 and 30, comprises a radio frequency control module that is able to wirelessly communicate information within a desired frequency band. In one implementation the RF module 38 and the SP/RF modules 20, 28 and 30 each form nodes, also known as "motes", of an overall integrated internet protocol (IP) communications network. In one specific implementation the network may be based on 6LoWPAN and 802.15.4e standards. One specific communications system that is suitable for implementation is the SmartMesh™ IP communications system available from Linear Technology Corporation of Milpitas, Calif. The SmartMesh™ IP communications system makes use of a plurality of motes and one or more network managers that work together to form a complete wireless mesh networking system that is readily scalable to meet the changing needs of modern-day data centers. Both the network manager and the 802.15.4 motes are available from Linear Technology Corporation in multiple form factors. For example, the 802.15.4 motes are available as a SmartMesh™ IP "mote-on-a-chip" (LTC5800-IPM) or a SmartMesh™ IP "mote module" (LTP5901/IPM). The network managers are available as SmartMesh™ "manager-on-a-chip" (LTC5800-IPR) and as a SmartMesh™ "embedded manager" (LTP5901-IPR).

In the present disclosure each of the SP/RF modules 20, 28 and 30 includes a service processor circuit that is combined with a 805.15.4 mote circuit, preferably as a single integrated circuit chip. The 805.15.4 mote circuit portion may be functionally identical or similar to the Linear Technology SmartMesh™ IP mote-on-a-chip (e.g., LTC5800-IPM). Thus, each of the SP/RF modules 20, 28 and 30 performs the dual functions of carrying out the operations of a traditional service processor, as well as wirelessly reporting important information stored or obtained by the service processor to the gateway device 40. Stand-alone RF module 38 may include an integrated circuit chip that communicates essentially as a stand-alone 802.15.4 mote, but in addition has a suitable interface to connect to one of the SP ports 32. The system 10 could also be implemented using the well-known WirelessHART® wireless communications protocol.

With system 10 of FIG. 1, the service processor portions of SP/RF modules 20, 28 and 30, and the service processor 18a within server 18, all may be encoded with one or more of types of important identification information for its associated asset. Such information may comprise one or more of manufacturer, serial number, model number, configuration information (e.g., operating system and version number), warranty information, power requirements, etc. This information may be reported in near real time to the gateway device 40, and subsequently to the DCIM system 42 in accordance with the management protocol being used (e.g., the SmartMesh™ IP wireless communications protocol). The DCIM system 42 may use the identification information in connection with any suitable asset tracking/management software to maintain and/or confirm an up-to-date (i.e., near real time) record of the locations of the assets. The ability of each SP/RF module 20, 28 and 30, as well as RF module 38, to report other important information obtained by its service processor portion further enables important real time information pertaining to its associated asset (e.g., fan speed, temperature, voltages, current draw, main processor real time utilization percentage, error or failure codes, etc.) to be wirelessly reported periodically in near real time to the gateway device 40.

Referring to FIG. 2, a system 100 is shown that is similar to the system 10, and components identical to those discussed in connection with FIG. 1 have been shown using the same reference numbers. The system 100 of FIG. 2, however, shows a modification in which the RF module 38 has been included in the server 18 as component 38', but not integrated into a single chip with the service processor 18a. Instead, the RF module 38' may be formed as an integrated circuit that is present on a separate circuit board that is connected to a motherboard (not shown) of the server 18, or possibly installed directly on the motherboard of the server 18. In either configuration, this may permit easier retrofitting of the RF module 38' into some types of data center assets.

FIG. 2 also illustrates a third server 50 having a stand-alone RF module 58 which is in communication with the gateway device 40. The gateway device 40 may be operating as a network manager as described in connection with the discussion of the system 10 shown in FIG. 1. The gateway device 40 coordinates communications between the data center assets (i.e., servers 12, 18 and 50, the PDU 14 and the UPS 16) and the DCIM system 42. The third server 50 may include one or more service processor ports 52, a USB port 54 and a video port 56. In this example the independent RF module 58 includes a housing 58a and a connector 58b, with the connector 58b being physically connected to one of the service processor ports 52.

Referring to FIG. 3, a system 200 is shown in accordance with a SmartMesh™ IP communications system, as in FIG. 1, but with the PDU 14, the UPS 16, the gateway device 40 and the DCIM system 42 in "Room 1", while the first server 12 is located in a different room ("Room 2"), and the second server 18 is located in still another room ("Room 3"). In this example Room 2 and Room 3 are both sufficiently close to Room 1 so that the SP/RF module 20 can make a RF connection (i.e., wireless connection) with the SP/RF module 28 in the PDU 14, and the RF module 38 can make an RF connection with the SP/RF module 30 in the UPS 16. The SmartMesh™ IP communications system allows a mote to "relay" its communications through a nearby mote if it is unable to connect directly with the gateway device 40. As such, even though placement of the first server 12 in a different room would ordinarily place it at too great a distance from the gateway device 40 to be able to make the needed wireless connection, the SP/RF module 20 is still able to communicate its information to the gateway device 40 by sending it to the SP/RF module 28, which in turn relays it to the gateway device 40. This is a significant advantage of a SmartMesh™—(or any other RF Mesh Network)—IP communications system and it provides the capability to locate various components within a given building at locations where the distance between a given SP/RF module (which acts as a mote) and the gateway device would otherwise be too great to make the wireless connection. As one will appreciate, this enables significant added flexibility in locating components in a data center. The wireless connections between the various SP/RF modules 20, 28 and 30, the RF module 38 and the gateway device 40 also eliminates the need for significant and expensive cabling. Moving assets from one location to another is also made easier by the elimination of physical cabling.

The various embodiments discussed above enable important identification and performance information for a wide variety of assets to be wirelessly transmitted to a gateway device, and then to a suitable management system. In this manner assets can be tracked virtually in real time, and changes in the location and/or configuration of assets within a data center may be immediately detected.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components/groups, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms "first," "second," "third," etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below.

What is claimed is:

1. A system for tracking assets in a facility, the system comprising:
   at least one asset having an internally housed service processor which is separate from a main processor of the asset, and wherein the service processor contains identification information which uniquely identifies the at least one asset among a group of assets;
   the at least one asset further including a module in communication with the service processor for reporting the identification information contained by the service processor to a gateway device; and
   a data center infrastructure management system in communication with the gateway device for receiving the identification information for subsequent use with an asset tracking system.

2. The system of claim 1, wherein the module for reporting the identification information comprises a radio frequency (RF) module for transmitting the identification information in wireless form to the gateway device.

3. The system of claim 2, wherein the RF module is integrated into the service processor.

4. The system of claim 1, wherein the module is integrated into the service processor.

5. The system of claim 1, wherein the module is configured to be connected via a connector to a port of the asset, and wherein the port is associated with a service processor of the asset.

6. The system of claim 5, wherein the module comprises a radio frequency (RF) module for wirelessly communicating the identification information to the gateway device.

7. The system of claim 1, wherein the module is connected via a cable to a port of the asset, and wherein the port is associated with a service processor of the asset.

8. The system of claim 7, wherein the module comprises a radio frequency (RF) module for wirelessly communicating the identification to the gateway device.

9. The system of claim 1, wherein the asset comprises at least one of:
   a server;
   a power distribution unit (PDU); and
   an uninterruptible power supply (UPS).

10. The system of claim 1, wherein the identification information of the asset comprises at least one of:
    a serial number;
    a model number;
    configuration information;
    operating system and version number;
    warranty information; and
    power requirements.

11. The system of claim 1, wherein the module is able to relay the identification information to the gateway device by transmitting the identification information to an intermediate asset located in a vicinity of the asset, and then having the intermediate asset relay the identification information to the gateway device.

12. A system for tracking assets in a facility, the system comprising:
    at least one asset having a service processor housed within the asset, and which is separate from a main processor of the asset, and which contains identification information which uniquely identifies the at least one asset among a group of assets;
    a gateway device for receiving wireless signals transmitted within the facility;
    the at least one asset further including a radio frequency (RF) module in communication with the service processor for reporting the identification information contained by the service processor to the gateway device via wireless signals; and
    a data center infrastructure management system in communication with the gateway device for receiving the identification information for subsequent use with an asset tracking system.

13. The system of claim 12, wherein the RF module is integrated with the service processor.

14. The system of claim 12, wherein the RF module is coupled via a cable to a port associated with the service processor.

15. The system of claim 12, wherein the RF module is coupled via a connector to a port associated with the service processor.

16. The system of claim 12, wherein the identification information comprises at least one of:
    a serial number;
    a model number;
    configuration information;
    operating system and version number;
    warranty information; and
    power requirements.

17. A method for tracking assets in a facility, the method comprising:
    providing at least one asset with a service processor housed within the asset, the service processor being separate from a main processor of the asset, and the asset containing identification information available from the service processor which uniquely identifies the at least one asset among a group of assets;
    placing a module in communication with the service processor, the module configured to report the identification information contained in the service processor to a gateway device; and
    using a data center infrastructure management system in communication with the gateway device for receiving the identification information for subsequent use with an asset tracking system.

18. The method of claim 17, wherein the operation of placing a module in communication with the service processor comprises placing a radio frequency (RF) module in communication with the service processor, the RF module configured to wirelessly transmit the identification information to the gateway device.

19. The method of claim 17, further comprising integrating the module with the service processor.

20. The method of claim 19, wherein the integrating the module with the service processor comprises integrating a radio frequency (RF) module with the service processor, and storing at least one of a serial number, a model number and warranty information in the service processor.

* * * * *